Dec. 8, 1959   R. GENEST   2,915,833
PSYCHOLOGICAL TESTING AND RECORDING APPARATUS
Filed Sept. 22, 1958   6 Sheets-Sheet 1

INVENTOR
Robert GENEST
BY
ATTORNEYS

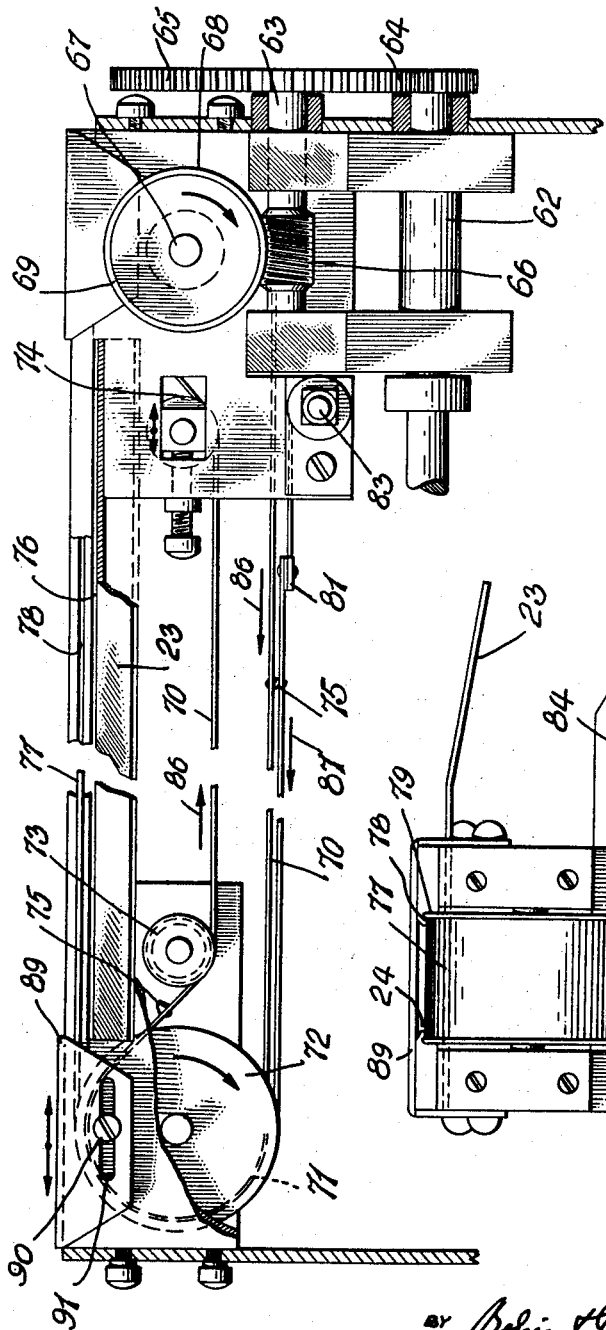
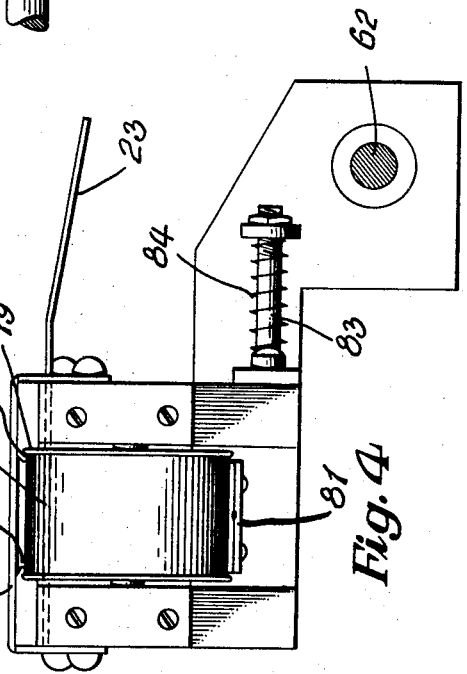

INVENTOR
Robert GENEST

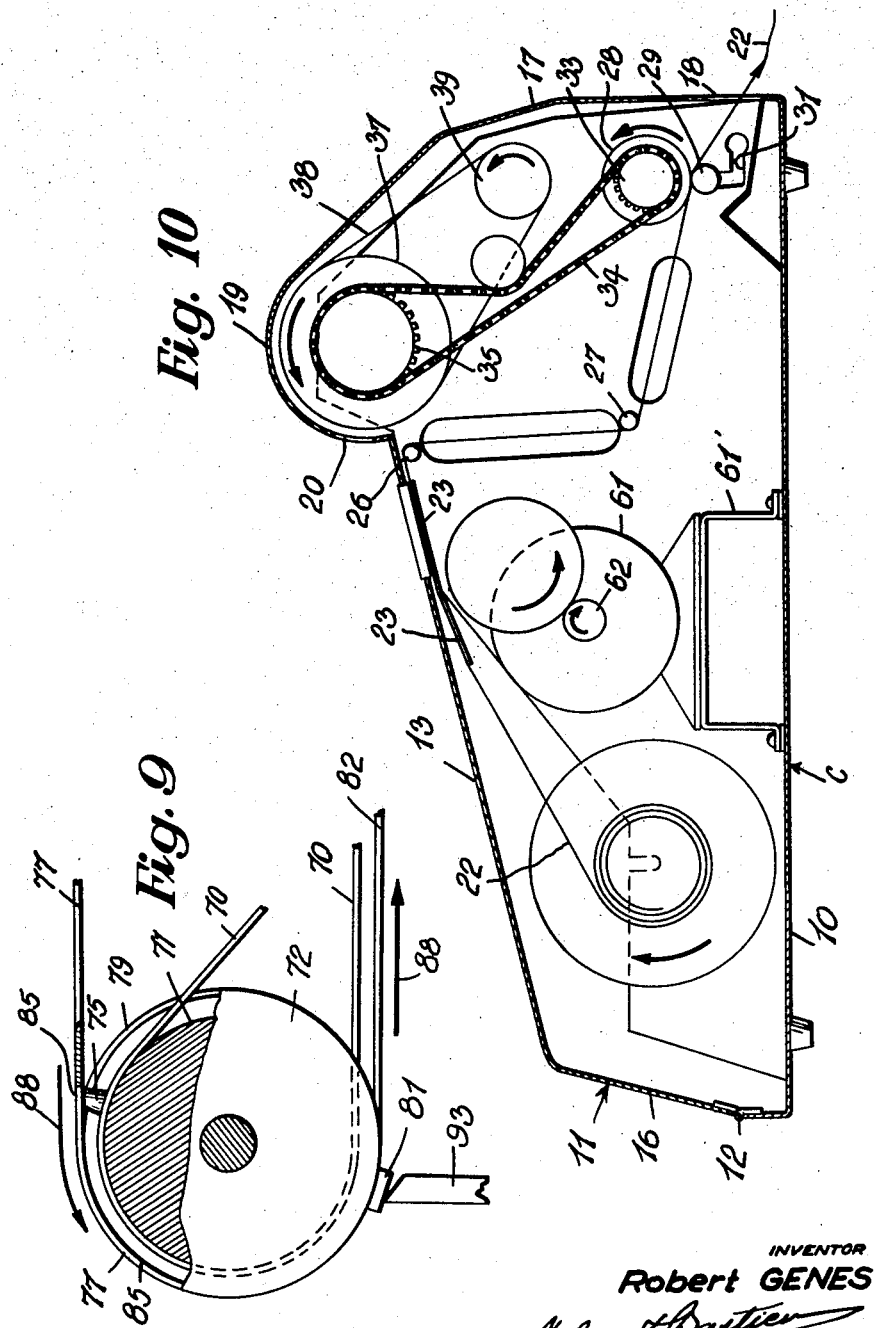

Dec. 8, 1959   R. GENEST   2,915,833
PSYCHOLOGICAL TESTING AND RECORDING APPARATUS
Filed Sept. 22, 1958   6 Sheets-Sheet 6
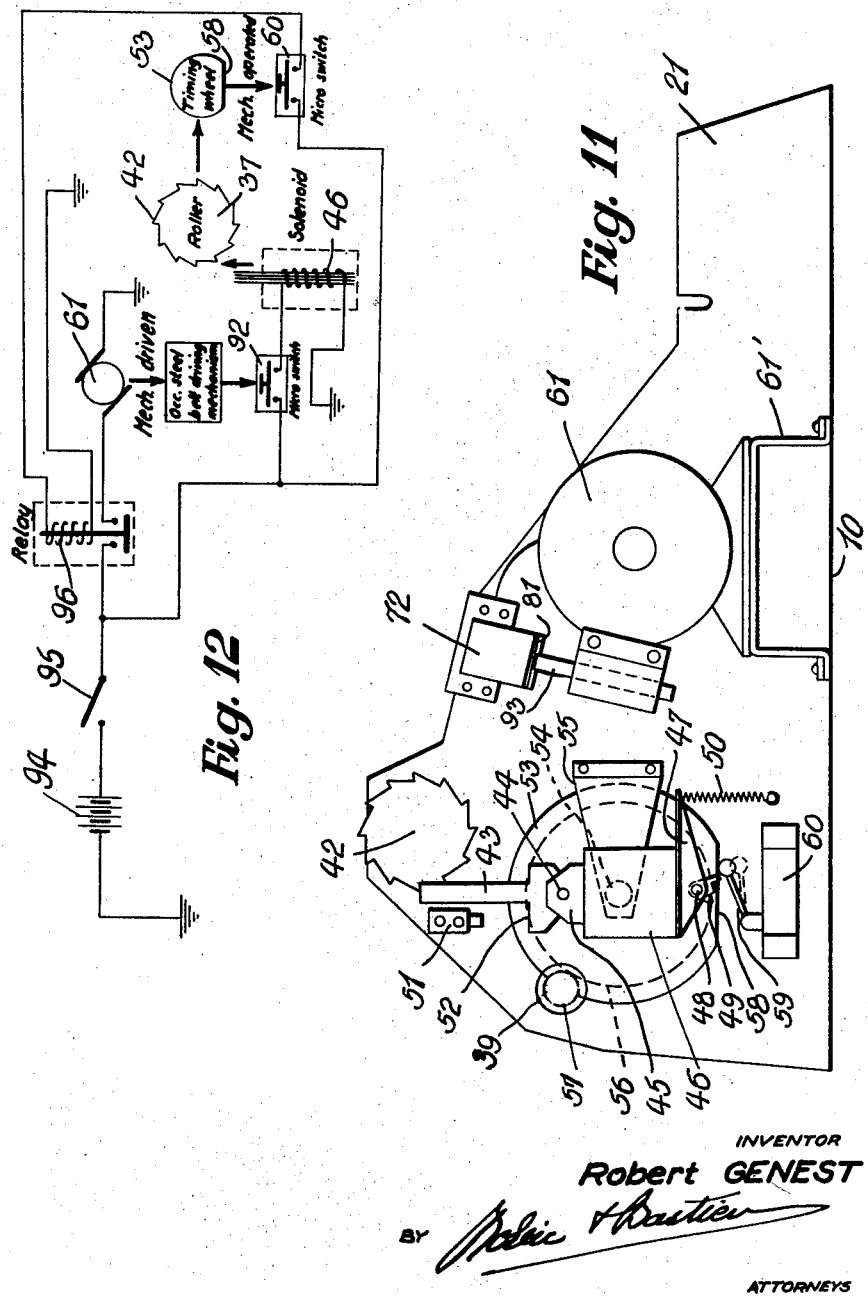
INVENTOR
Robert GENEST
BY
ATTORNEYS

United States Patent Office 2,915,833
Patented Dec. 8, 1959

2,915,833

PSYCHOLOGICAL TESTING AND RECORDING APPARATUS

Robert Genest, Montreal, Quebec, Canada

Application September 22, 1958, Serial No. 762,426

7 Claims. (Cl. 35—22)

The present invention relates to mental and psychological testing and recording apparatus and, more particularly, to an apparatus for taking so-called effectively tests wherein an association of ideas is generated from an inductor term.

The present invention is an improvement over the device described in U.S. Patent No. 2,715,784 of August 23, 1955, by the same inventor.

The apparatus in accordance with the present invention is based, as the apparatus of the above noted U.S. patent, on the provision of a writing space which is gradually screened or masked in accordance with a carefully predetermined time table. Thus the person taking the test, or testee, is given a definite time for answering specific questions, and is constantly aware of the progress of the time allotted.

In the apparatus in accordance with the above noted U.S. patent, the questions or inductor terms had to be given to the testee on an individual test sheet or on a blackboard and he tended to confuse the order of the questions or inductor terms or else the inductor terms were flashed in succession on a screen by a suitable projecting apparatus which required additional equipment. Also the mechanism for progressively screening or masking the writing area consisted of a belt with a window opening which moved transversely over the paper strip constituting the writing area. In such an arrangement, the belt has to move at a constant speed and because the window opening had to extend over a limited length of the belt, the testee had to wait an unduely long time between the answers to the successive questions. Also, with such a belt arrangement the writing area was progressively unmasked from left to right until complete visibility of the writing area and then was progressively masked from left to right by the trailing end of the window opening. This arrangement tended to confuse testees because the writing speed of individuals varies, for instance, some of the testees felt that the writing area did not become unmasked quickly enough for them to write at their normal speed of writing. Thus the apparatus tended to introduce a factor which colored the answers of the different testees.

Therefore, the general object of the present invention is the provision of an improved psychological testing and recording apparatus which will obviate the above noted disadvantages.

Still another important object of the present invention is the provision of an apparatus of the character described in which means are provided for showing the inductor terms to be answered in succession and in a synchronized manner with the masking and unmasking of the writing area.

Another important object of the present invention is the provision of an apparatus of the character described having a new and improved masking mechanism for the writing area, said mechanism reducing to a minimum the time interval between successive answers and also eliminating the gradual unmasking of the writing area from left to right whereby the testees will be free to write at their normal speed.

Yet another important object of the present invention is the provision of a masking mechanism in a machine of the character described which cannot be retarded or damaged by the testee taking a psychological test.

Still another important object of the present invention is the provision of new and improved advancing means for the writing paper.

Yet another important object of the present invention is the provision of an apparatus of the character described which is started in operation by the person under test.

With the apparatus of the present invention, no supervision of the testee is required.

The foregoing and other important objects of the present invention will become more apparent during the following disclosure and by referring to the drawings in which:

Figure 3 is a side elevation, partly in section, of the masking mechanism for the writing area;

Figure 4 is an end view of the masking mechanism taken from the left hand side of Figure 3;

Figure 9 is a partial elevation of part of the masking mechanism showing the latter at the end of its stroke and showing how the masking strip is released for its return movement;

Figure 10 is a longitudinal section of the machine showing in a diagrammatic manner the means for advancing the writing paper and the means for showing the inductor terms in succession;

Figure 11 is a schematic side view of the inside mechanism of the apparatus at the left hand side of the machine; and Figure 12 is a diagram of the electrical circuit used in the apparatus of the present invention.

Figure 1:
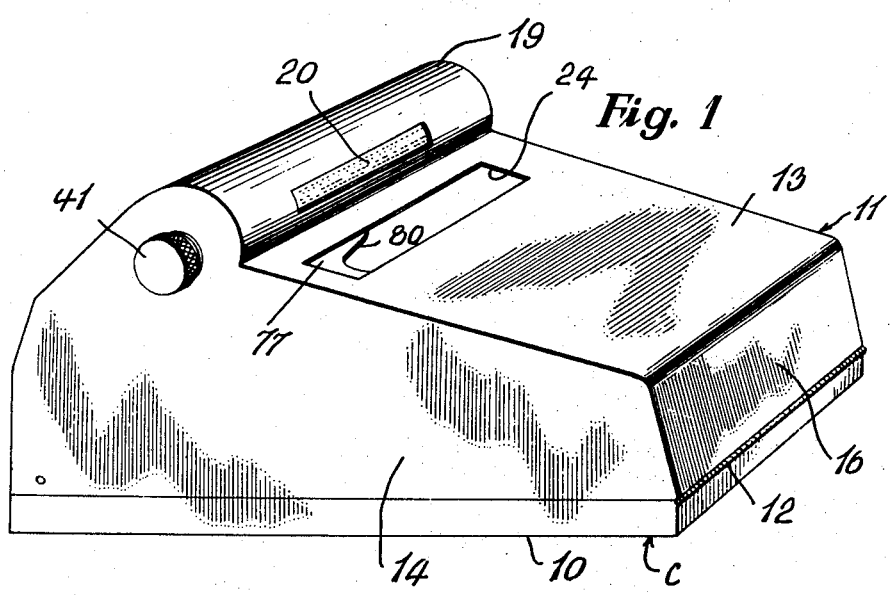
Figure 1 is a perspective view of the apparatus.
Figure 7:
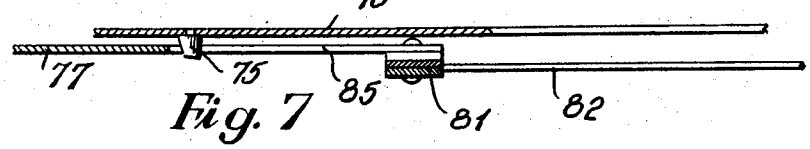
Figure 7 is a longitudinal section of a detail of the masking mechanism.
Figure 8:
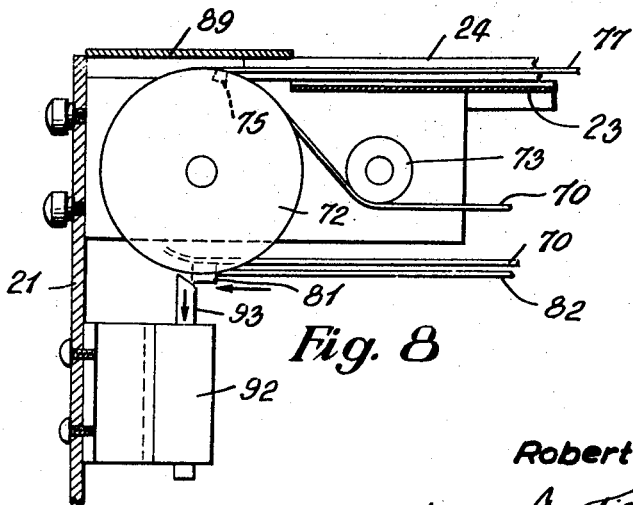
Figure 8 is a side elevation, partly in section, corresponding to the left hand side of Figure 3, showing the mechanism at the end of its stroke.
Figure 5:
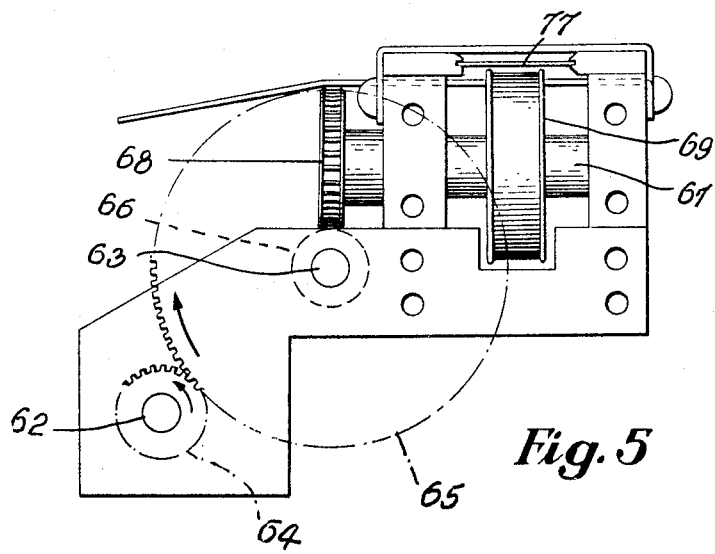
Figure 5 is an end view taken from the right hand side of Figure 3.

Referring now more particularly to the drawings in which like reference characters indicate like elements throughout, the letter C generally indicates a portable casing in the form of a desk and provided with a base 10 and a cover 11 hinged to the base 10 at 12 at the front part of the casing C. The cover 11 provides a sloping top surface 13, a left side wall 14, a right side wall 15, a front wall 16 and a back wall 17.

The back wall 17 defines a transverse elongated slot 18 with the base 10 and forms, with the top surface 13, a curved top portion 19 projecting upwardly from the top surface 13 and defining a window opening 20 facing the testee and through which an inductor term or question appears.

Figure 2:
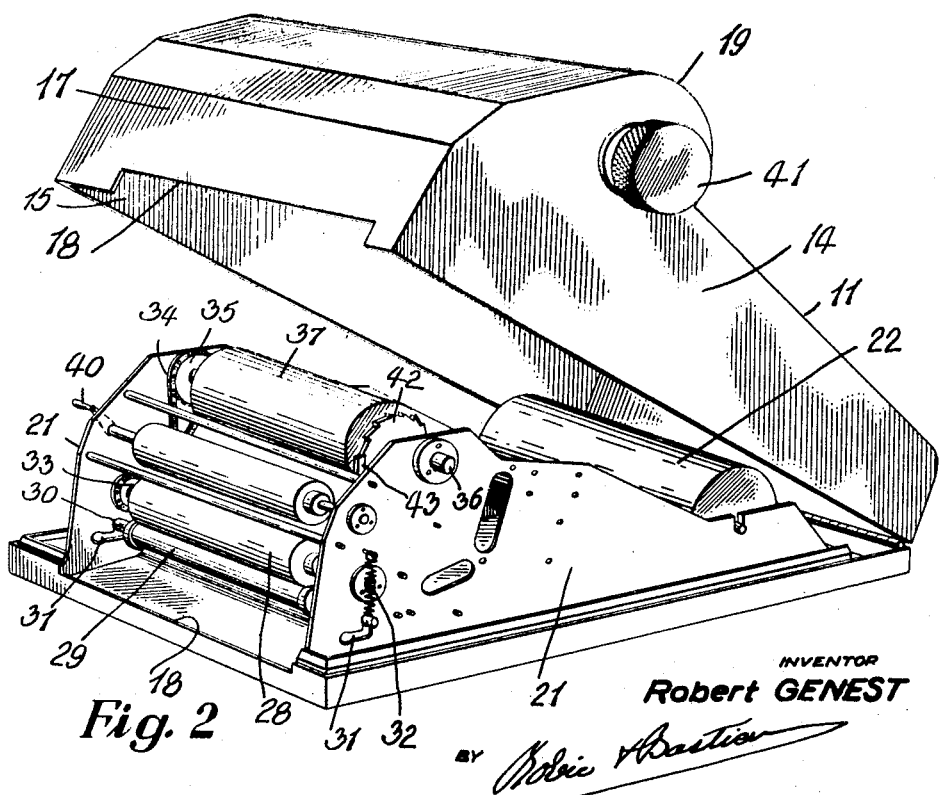
Figure 2 is a back perspective view of the inside of the apparatus, the cover being opened.
Figure 6:
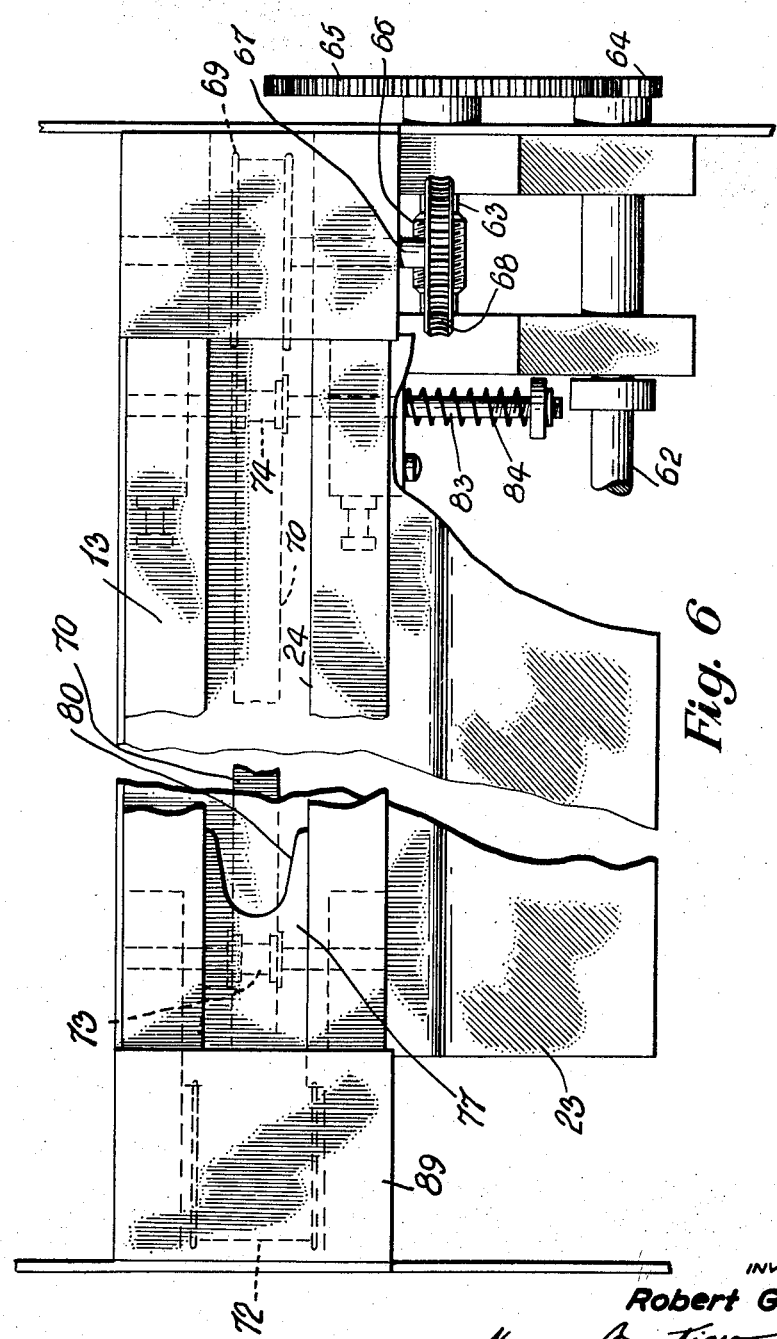
Figure 6 is a top plan view of the masking mechanism.

As shown in Figure 2, longitudinally extending upright supporting walls 21, for mounting the mechanism of the apparatus, are secured to the base 10 in spaced parallel relationship.

A supply roll of blank writing paper 22 is removably and rotatably mounted on the supporting walls 21 and the writing paper 22 is threaded through the machine in the manner shown in Figure 10. More particularly, the writing paper passes over a transversely extending support plate 23, which supports the writing paper in close proximity to the top surface 13, underneath the latter and across an elongated transversely extending window opening 24 made in the top surface 13 of the cover 11 and defining the writing area. The writing paper 22 is then trained over guiding idle rollers 26 and 27 and passes between driving roller 28 and spring-pressed roller 29 and finally issues through the slot 18 at the back of the apparatus. As shown in Figure 2, the press roller 29 has a protruding shaft 30 which is engaged in L-shaped slots 31 made in the supporting walls 21; springs 32 attached to said supporting walls and to the shaft 30 urge the press roller 29 into engagement with the driving roller 28, while the slots 31 allow release of the writing paper 22 by moving the press roller 29 away from the driving roller 28.

The paper driving roller 28 is rotated by means of sprocket gear 33, sprocket chain 34 and sprocket gear 35 which is mounted on the shaft 36 of a question drum 37 disposed just underneath the curved top portion 19 of the casing cover 11 and adjacent the question window 20. An endless belt 38 is trained over the question drum 37 and over an idle roller 39; longitudinally adjacent areas of said belts are inscribed with inductor terms or questions to be shown through window opening 20. The proper positioning of the belt 38 with respect to the window opening 20 can be manually effected through the means of the crank handle 40 removably secured to the shaft of the idle roller 39 and slidably mounted through the cover 11. An external screw knob 41 is threadedly mounted on the left hand side of the casing cover 11 and is adapted to abut and push the shaft 36 upon rotation of said screw knob 41 to thereby adjust the alignment of the gear 35 with gear 33. The shaft 36 is spring-urged against screw knob 41.

The crank handle 40 may be rotated by the testee to bring the first question in register with the window opening 20, thereby automatically starting the operation of the apparatus in the manner which will be described hereinafter. The machine will operate until the last question has been answered at which time it will automatically stop.

During operation of the apparatus the question drum 37 is rotated step by step through the means of a ratchet wheel 42 fast on the shaft 36 (Figure 11) and a pawl 43 engaging said ratchet wheel and rigidly attached at 44 to the plunger 45 of a solenoid 46 which is secured to and mounted on a bracket 47. The bracket 47 is pivotally connected at 48 to a support 49 rigidly secured to a supporting wall 21 of the apparatus. A spring 50, connected to the outer end of the bracket 47 and to the supporting wall 21, urges the outer end of the pawl 43 against the ratchet wheel 42 through the means of the plunger 45 and solenoid 46. An adjustable stop 51 is adapted to abut the shoulder 52 of the pawl 43 in order to control the stroke of said pawl. Thus operation of the solenoid 46 will cause upward movement of the pawl 43 which will in turn rotate the ratchet wheel 42 the extent of one tooth. The ratchet wheel 42 in turn rotates the question drum 37 and question belt 38 so as to bring the next question or inductor term in register with the question window 20. Rotation of the question drum 37 will in turn rotate the paper driving roller 28 through the sprocket gears 33 and 35 and sprocket chain 34 to thereby advance the writing paper 22 so as to bring a blank writing area opposite the writing window 24.

A timing wheel 53 is mounted on a stud shaft 54 which is itself secured to a bracket 55 fastened to a supporting wall 21 of the base 10. The timing wheel 53 is rotated through gear wheels 56 and 57, the latter being secured to the shaft of the idle roller 39. Complete rotation of the question belt 38 will cause one complete rotation of the timing wheel 53. The latter has a flat peripheral portion 58, which upon engagement with the actuating lever 59 of a micro-switch 60, causes opening of said switch 60.

The occluding or masking mechanism for the writing area is illustrated in Figures 3 to 9 inclusive.

An electric motor 61, supported on a bracket 61' which is secured to the base 10 of the machine, has an output shaft 62 (see Figure 3) which drives a worm shaft 63 through gears 64 and 65. A worm 66 fast on the shaft 63 drives a shaft 67 through the intermediary of worm gear 68. The shaft 67 extends longitudinally of and on one side of the apparatus underneath the top surface 13. A driving pulley 69 (see Figures 5 and 6) is secured to the shaft 67 and its top peripheral portion is in alignment with the writing window 24 and disposed at one end thereof. An endless steel belt 70 is trained on the driving pulley 69 and engages the deep central groove 71 of an idle pulley 72, which is disposed at the opposite side of the apparatus in alignment with the writing window 24 and just underneath the top surface 13 of the cover 11 (see Figures 3 and 9).

As shown in Figure 3, the top run of the steel belt 70 is caused to move downwardly from the top surface 13 by means of idle roller 73 and belt tensioning roller 74. Two short pins 75 are rigidly secured to the steel belt 70 at equal distances apart longitudinally of said belt and such that said pins will project radially outwardly of the pulley 72 when the belt moves over said pulley. A masking strip 77 made of steel or the like thin flexible material is mounted for reciprocating movement across the writing window 24 so as to occlude or mask said window from left to right and to uncover the writing area from right to left. The masking strip 77 slides in guiding channels 78 made in the longitudinal sides of the writing window 24 and is trained on the pulley 72 by engaging between the peripheral flanges 79 thereof, such that the portion of the masking strip 77 trained on the pulley 72 is radially outwardly disposed with respect to the driving steel belt 70. The masking strip 77 has a free outer end, more particularly shown in Figure 6, which is preferably notched to provide a curved recess 80. The rear end of the masking strip 77 is secured by a block 81 to a wire 82, the other end of which is wound on a shaft 83 which is urged by coil spring 84 to rotate in a direction to pull the masking strip 77 so that the latter will uncover the writing window 24. The trailing end of the masking strip 77 adjacent the block 81 which secures said strip to the wire 82 is provided with a longitudinally extending central slot 85 adapted to receive any one of the pins 75, as clearly shown in Figure 7.

From the foregoing it will be seen that the driving steel belt 70 is in continuous clockwise rotation in accordance with the arrows 86 (see Figure 3).

When any one of the pins 75 engages the slot 85 of the masking strip 77, the latter is moved by the driving belt in the direction of arrow 87, resulting in the masking of the writing window 24. During its masking movement, the masking strip 77 is guided by the idle pulley 72 and by the guiding channels 78 such that the masking strip moves just underneath the top surface 13 and above the writing paper 22 which is supported by the support plate 23; the writing paper moves through the slot 76, shown in Figure 3.

As soon as the forward end of the masking strip 77 reaches the right end of the writing window 24 thereby completely masking the latter, the pin 75 in engagement with the slot 85 of the masking strip 77 will disengage said slot, as shown in Figure 9, due to the fact that the driving steel belt 70 moves gradually away from the masking strip 77 upon leaving the pulley 72. Upon release of the masking strip 77 from the driving belt 70, said strip is urged back into a window unmasking position under the action of wire 82 and coil spring 84, as shown by the arrows 88 of Figure 9. When the pin 75 has reached about the middle of the apparatus, the other pin 75 is already in a position to engage the slot 85 of the masking strip to thereby again drive the latter into window masking position.

From the foregoing it will be seen that the writing window 24 is gradually masked from left to right and is quickly unmasked from right to left under the action of the coil spring 84. The unmasking of the window takes place immediately after completion of the masking movement of the strip 77. Therefore, there is no interval between answers to the successive questions or inductor terms.

The length of the window opening can be adjusted by a shield 89, shown in Figure 3, which is longitudinally adjusted by means of a set screw 90 engaging a slot 91 made in the side flange of said shield 89.

The operation of the writing paper feeding or advancing mechanism and question belt advancing mechanism, previously described, is controlled in the following manner by the movement of the occluding mechanism for the writing window.

A microswitch 92 (see Figure 8) is disposed just underneath the idle pulley 72 and its actuating finger 93 is adapted to be depressed upon contacting the boss or block 81 at the trailing end of the masking strip 77. The boss 81 actuates the microswitch finger 93 when the masking strip has reached its writing window occluding position. Operation of the microswitch closes the circuit to the solenoid 46 which actuates the movement of the question belt 38 and the paper advancing mechanism as previously described.

Figure 12 shows the electrical circuit of the apparatus in accordance with the present invention. The apparatus may be connected to a source of direct current, as indicated by the battery 94, or by a conventional source of alternating current, for instance at 110 volts.

In the initial position of the apparatus, the timing wheel 53 has its flat portion 58 in contact with the lever 59 of the microswitch 60, whereby the control circuit is open by said microswitch. Therefore, upon closing of the main switch 95, the motor 61 does not start until the timing wheel 53 is manually rotated by crank handle 40 in order to close the microswitch 60. This closing energizes relay 96 which closes the circuit to the electric motor 61 thereby starting operation of the apparatus. The initial manual rotation of the timing wheel 53 has also positioned the first question in register with the question window 20. Operation of the motor 61 immediately starts the masking movement of the masking strip 77 so that the testee must answer the question appearing through window opening 20 immediately the crank handle 40 has been turned.

At the end of the time allotted for the answer, the masking strip 77 has reached its limit window closing position, whereby the microswitch 92 is closed and the solenoid 46 is energized thereby causing rotation of the question drum or roller 37 to bring the next question in register with the question window 20. Simultaneously, the masking strip 77 completely clears the writing window 24, whereby the testee is permitted to answer the second question by writing the same on the writing paper 22 which has also been advanced by the paper advancing mechanism.

Each time the question roller or drum 37 is rotated, the timing wheel 53 is also rotated through a predetermined angle and at the end of the question and answer period, the timing wheel is back into its initial position, thereby causing opening of the microswitch 60 which in turn cuts off energization of the relay 96 which opens the circuit to the electric motor 61 and the apparatus comes to a stop.

While a preferred embodiment in accordance with the present invention has been illustrated and described, it is understood that various modifications may be resorted to without departing from the spirit and scope of the appended claims.

I claim:

1. An apparatus for taking psychological tests comprising a casing having a writing window in the top surface thereof, a strip of writing paper disposed to be unrolled underneath said window and be displayed therethrough, a masking strip movable transversely above said paper strip between said paper strip and said window, means for progressively moving said masking strip in the direction of writing to progressively mask said window, means to quickly return said masking strip to window unmasking position, said casing having a question window in the top thereof, a member bearing questions or inductor terms disposed to be moved underneath said question window to successively display questions through said question window and a step-by-step mechanism for moving said member across said question window and for advancing said writing paper across said writing window and actuated by movement of said masking strip.

2. An apparatus as claimed in claim 1, wherein said means for moving said masking strip include an endless belt rotated at constant speed by a prime mover and trained on two pulleys, a pin projecting from said belt, said masking strip being disposed in close relation with said belt and having a slot engageable by said pin whereby said belt drives said masking strip in window masking movement, means to guide said belt progressively away from said masking strip thereby causing disengagement of said pin with the slot in said masking strip and release of said masking strip from driving engagement with said belt, and spring means connected to said masking strip and urging said masking strip into window unmasking position upon release of said masking strip from said pin.

3. An apparatus as claimed in claim 2, wherein one of said pulleys has a central deep groove and a shallow wide groove, said driving belt being narrower than said masking strip and engaging said deep groove while said masking strip engages said shallow groove of said pulley, said driving pin projecting from said belt towards said masking strip and engaging the slot of the latter for the major portion of the movement of said strip and belt around said pulley, said belt and strip leaving said pulley at a mutual angle to thereby provide gradual spacing of said belt from said strip and disengagement of said pin from said slot in the strip.

4. An apparatus as claimed in claim 3, wherein said step-by-step mechanism includes a ratchet wheel, a pawl operable to engage said ratchet wheel, an electric solenoid for operating said pawl and an electric switch operable by said masking strip when the latter reaches its masking limit position to close the electric circuit to said solenoid and thereby energize said solenoid.

5. An apparatus as claimed in claim 4, wherein said solenoid is mounted for pivotal movement with respect to said casing, said pawl being rigid with a plunger movable within said solenoid and stop means for adjusting the active stroke of said pawl.

6. An apparatus as claimed in claim 5, further including a timing mechanism operable by movement of said step by step mechanism to start and stop operation of said prime mover upon one complete rotation of said question bearing member.

7. An apparatus as claimed in claim 1, wherein said question bearing member is in the form of an endless belt.

References Cited in the file of this patent

UNITED STATES PATENTS

| | | |
|---|---|---|
| 2,359,460 | Barens | Oct. 3, 1944 |
| 2,715,784 | Genest | Aug. 23, 1955 |